(12) United States Patent
Cannon et al.

(10) Patent No.: US 6,353,305 B1
(45) Date of Patent: Mar. 5, 2002

(54) BATTERY CHARGER WHERE THE CHARGE CURRENT RATE IS SET BY A SWITCH MODULATED WITH A VARIABLE DUTY CYCLE

(75) Inventors: Joseph M. Cannon, Harleysville; George A. Crisafulli, Hatfield, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/579,565

(22) Filed: May 26, 2000

(51) Int. Cl.[7] .............................. H02J 7/06; H02J 7/24; H02J 7/04

(52) U.S. Cl. ........................................ 320/141; 320/163

(58) Field of Search .................... 320/125, 139, 320/141, 161, 162, 163; 363/85, 89; 323/299

(56) References Cited

U.S. PATENT DOCUMENTS

| | | | | |
|---|---|---|---|---|
| 5,523,670 A | * | 6/1996 | Ninomiya | 320/161 |
| 5,666,042 A | * | 9/1997 | Lewis | 320/163 |
| 5,734,252 A | * | 3/1998 | Griffin et al. | 320/125 |
| 5,764,035 A | * | 6/1998 | Lee | 320/160 |
| 6,081,096 A | * | 6/2000 | Barkat et al. | 320/124 |
| 6,087,802 A | * | 7/2000 | James | 320/104 |

* cited by examiner

Primary Examiner—Gregory J. Toatley, Jr.

(57) ABSTRACT

A battery charging circuit, a method of charging a battery and a battery-powered electronic device employing the circuit or the method. In one embodiment, the battery charging circuit includes a charging switch coupled between a base interface of the battery-powered electronic device and a battery thereof to be charged. When closed, the charging switch provides a conductive path for charge current from the base interface to the battery. The charge current is based on an input voltage of the battery charging circuit and a voltage of the battery. The battery charging circuit further includes a controller that modulates the charging switch at a duty cycle that at least in part determines a rate at which the charge current is delivered to the battery thereby to compensate at least in part for variations in the input voltage.

20 Claims, 2 Drawing Sheets

BATTERY CHARGER WHERE THE CHARGE CURRENT RATE IS SET BY A SWITCH MODULATED WITH A VARIABLE DUTY CYCLE

TECHNICAL FIELD OF THE INVENTION

The present invention is directed, in general, to electronic devices and, more specifically, to a battery charger for a battery-powered electronic device and a method of operating the same to charge a battery more precisely under varying input voltage conditions.

BACKGROUND OF THE INVENTION

The number of battery-powered electronic devices is rapidly increasing due to user demands for higher mobility and broader general utility. This has resulted in a higher demand for improved performance from the batteries to allow the electronic devices to be operationally available for a greater percentage of the time. Conventional battery monitoring and conditioning systems are focused on simplicity of operation regardless of any degenerative impact that the systems may have on the batteries themselves. For example, a conventional battery monitoring and conditioning system may provide a fixed charging current during the charging period. This fixed charging current is typically maximized to assure that the batteries are charged quickly. Alternatively, a battery may be charged only by a trickle current, which may not damage the battery but will require an unacceptably long period of time to charge a fully discharged battery.

A few parameters that are detrimental to batteries include a large or uncontrolled charge current, a constant value of charging voltage that is too high, a high battery temperature that causes the battery to vent gas, shorted battery cells that force other cells to overcharge, and conditions that cause the battery to be discharged beyond a certain minimum threshold. A maximum charging current is often limited only by the internal resistance of the batteries themselves. A large battery charging current produces a high likelihood that the batteries will overheat. Overheating of the batteries causes the internal resistance of the batteries to decrease further, thereby allowing the charging current to further increase. This process, if unchecked, often produces a thermal runaway condition that either partially or severely damages the batteries.

Even if the batteries do not enter a thermal runaway condition, a "thermal event" may exist wherein the batteries becomes overheated and vents gas to the environment, causing the batteries to dry out. Over time, battery cells that have been damaged by a charging process may become shorted. A shorted battery cell can no longer properly store energy, which forces other battery cells in the battery to overcharge. This condition usually requires that the battery be removed and discarded. Although simple in operation, the conventional battery conditioning system treats all batteries in the same way and usually monitors the voltage condition of the battery only to determine the presence of a shorted cell.

Accordingly, what is needed in the art is an improved system and method of charging a battery that allows a battery to be charged at an appropriate level while avoiding detrimental conditions such as the thermal event described above.

SUMMARY OF THE INVENTION

To address the above-discussed deficiencies of the prior art, the present invention provides, for use in a battery-powered electronic device, a battery charging circuit, a method of charging a battery and a battery-powered electronic device employing the circuit or the method. In one embodiment, the battery charging circuit includes a charging switch, coupled between a base interface of the battery-powered electronic device and a battery thereof to be charged. When closed, the charging switch provides a conductive path for charge current from the base interface to the battery. The charge current is based on an input voltage of the battery charging circuit and a voltage of the battery. The battery charging circuit further includes a controller that modulates the charging switch at a duty cycle that at least in part determines a rate at which the charge current is delivered to the battery thereby to compensate at least in part for variations in the input voltage.

The present invention introduces, in one aspect, the concept of providing a battery charging circuit that employs a charging switch associated with a battery-powered electronic device to charge the battery in a more accurate manner. The battery charging circuit is sensitive to both its input voltage and the actual voltage of the battery. This allows the battery charging circuit to apply an appropriate charge current that will charge the battery in an effective manner while limiting the possibility of battery damage due to overcharging. This strategy provides a minimal charging time while protecting the battery. Additionally, the present invention can advantageously employ portions of a controller that are already in place to control the electronic device.

In one embodiment of the present invention, the battery charging circuit further includes a trickle charge resistor, coupled in parallel with the charging switch, that provides a trickle charging conductive path for a trickle charging current. The trickle charging current represents a minimum value of charge current for the battery. The value of the trickle charge resistor may preferably be selected to establish an appropriate trickle charging current to minimize the needed modulation of the charging switch.

In a related embodiment of the present invention, the controller includes a processor that modulates the charging switch based on the trickle charging current. The trickle charging current indicates a condition of charge on the battery thereby allowing the modulation of the charging switch to be adjusted as appropriate to optimize the charging of the battery.

In one embodiment of the present invention, the controller includes a processor that modulates the charging switch based on the input voltage. This allows the duty cycle of the charging switch to be increased or decreased to compensate for variations in the input voltage, thereby providing an appropriate charging rate.

In one embodiment of the present invention, the controller includes a processor that modulates the charging switch based on the voltage of the battery. Monitoring the voltage of the battery allows the charge of the battery to be determined. The charging current may then be adjusted to optimize the charging response of a particular battery.

In one embodiment of the present invention, the controller contains a preprogrammed set of discrete duty cycles for the charging switch that establishes a corresponding set of discrete charging rates. In an embodiment to be illustrated and described, the electronic device controller contains ten different discrete duty cycles, evenly spaced and based on a period of one second. Alternatively, any number of different discrete duty cycles may be employed, and the period may be adjusted to accommodate a specific application.

In one embodiment of the present invention, the battery-powered electronic device is a cordless telephone. Those skilled in the pertinent art will understand, however, that the principles of the present invention may be applied to any battery-powered electronic device.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
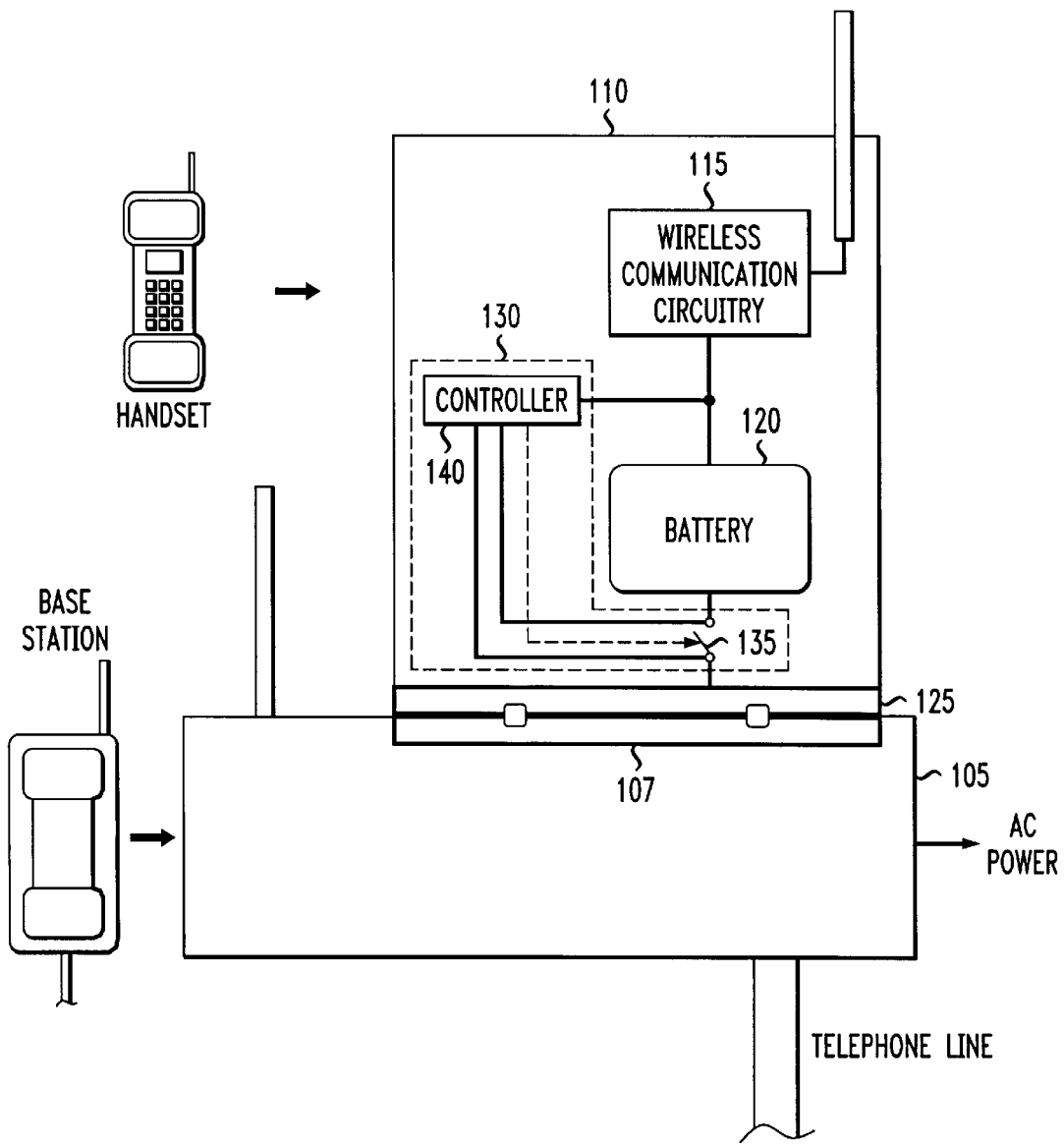
FIG. 1 illustrates a pictorial diagram showing an embodiment of a battery-powered electronic device, connected in a battery charging mode, constructed according to the principles of the present invention.

Referring initially to FIG. 1, illustrated is a pictorial diagram showing an embodiment of a battery-powered electronic device (e.g., a cordless telephone) 100, connected in a battery charging mode, constructed according to the principles of the present invention. The cordless telephone 100 includes a base 105 having a handset interface 107. The cordless telephone 100 further includes a handset 110. The handset 110 includes wireless communication circuitry 115, a battery 120 that powers the wireless communication circuitry 115, a base interface 125 that removably couples to the handset interface 107 to allow the battery to receive charge current from the base 105, and a battery charging circuit 130.

The battery charging circuit 130 includes a charging switch 135 that is coupled between the base interface 125 and the battery 120. The battery charging circuit 130 further includes a controller 140. The charging switch 135, when closed, provides a conductive path for the charge current from the base 105 to the battery 120. The charge current is typically based on an input voltage of the battery charging circuit 130 and a voltage of the battery 120. The controller 140 modulates the charging switch 135 at a duty cycle that at least in part determines a rate at which the charge current is delivered to the battery 120. The cordless telephone 100 is only one example of a battery-powered electronic device. Those skilled in the pertinent art will understand, however, that the principles of the present invention shown in the illustrated embodiment may be applied to any battery-powered electronic device.

In the illustrated embodiment, the controller 140 monitors the input voltage of the battery charging circuit 130 and the voltage across the battery 120. The controller 140 contains a preprogrammed set of discrete duty cycles for the charging switch 135 that establishes a corresponding set of discrete charging rates for the battery 120. The charging rate selected may depend on a differential voltage value between the existing input voltage and battery voltage along with the targeted voltage across the battery 120 when it is fully charged.

The switching cycle may be divided into a primary interval D (during which the charging switch 135 is closed or in a conduction mode) and an auxiliary interval 1-D (during which the charging switch 135 is open or in a non-conduction mode). The controller 140 determines when the charging switch 135 will be conducting or non-conducting. This may be accomplished in concert with both an internal timing signal, which sets the actual switching signal period and an error signal derived from the voltages being monitored.

The controller 140 thus exhibits an active decision process during the primary interval D. Any change in the error signal either continues to keep the charging switch 135 in the conduction mode (during the primary interval D) or places the charging switch 135 in the non-conduction mode (during the auxiliary interval 1-D). During the auxiliary interval 1-D, however, the controller 140 typically waits for the timing signal to begin a new switching cycle. In the illustrated embodiment, the controller 140 develops ten different discrete duty cycles based on an actual switching signal period of one second. The ten discrete duty cycles correspond to ten discrete charging rates for the battery 120.

Figure 2:
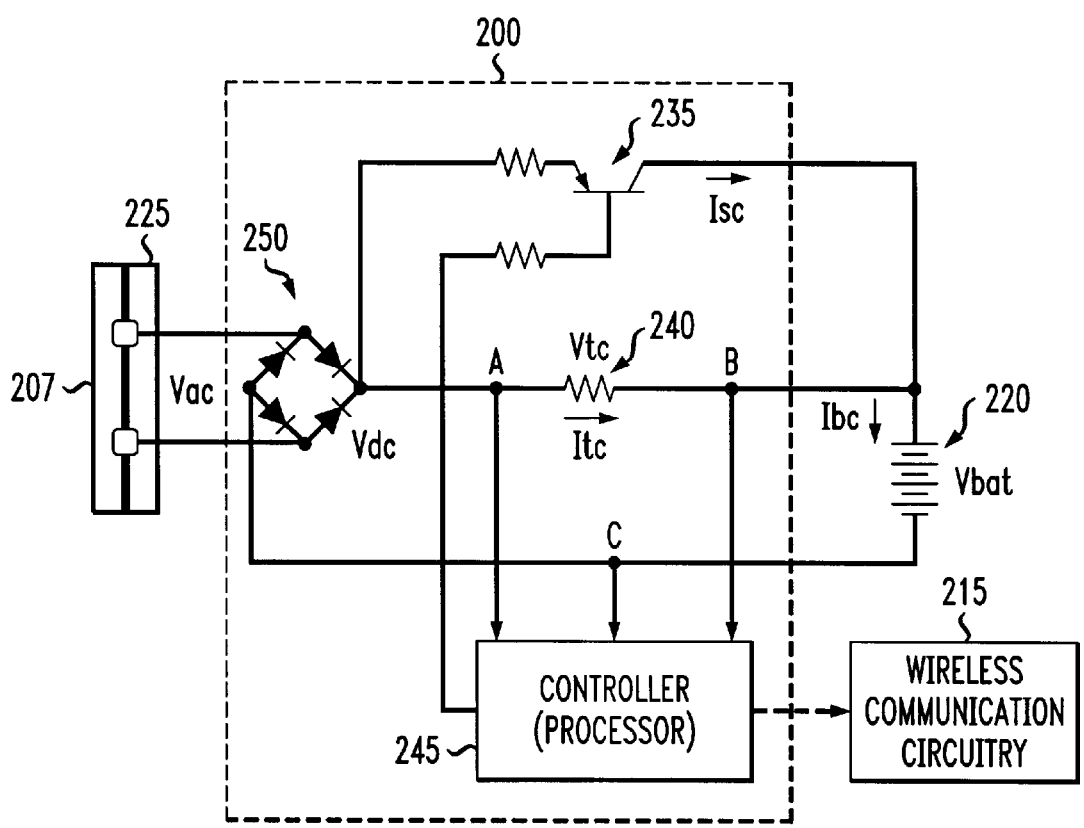
FIG. 2 illustrates a schematic diagram of an embodiment of a battery charging circuit constructed according to the principles of the present invention.

Turning now to FIG. 2, illustrated is a schematic diagram of an embodiment of the battery charging circuit 200 constructed according to the principles of the present invention. The battery charging circuit 200 is employable, for instance, in the cordless telephone 100 illustrated and described with respect to FIG. 1.

The battery charging circuit 200 is coupled to a base interface 225 that is removably coupled to a handset interface 207 of a base (not shown). The battery charging circuit 200 is further coupled to a battery 220 having a battery voltage Vbat. The battery charging circuit 200 is further coupled to wireless communication circuitry 215.

The battery charging circuit 200 includes a charging switch 235, a trickle charge resistor 240, a controller 245, and a rectifier 250 for receiving an AC input voltage Vac and providing a rectified input voltage Vdc. The charging switch 235 provides a charge current Isc. The trickle charge resistor 240, which develops a trickle voltage Vtc thereacross, provides a trickle charging current Itc therethrough. A total battery charging current Ibc is the sum of the charge current Isc and the trickle charging current Itc.

When a handset (such as the handset 110 of FIG. 1) is connected to the handset interface 207, the AC input voltage Vac is applied through the base interface 225 to the rectifier 250. The AC input voltage Vac, which may, in the illustrated embodiment, have a nominal value of 11.2 volts, may vary significantly due to variations in AC line voltage. This AC input voltage variation should ideally be compensated for by the battery charging circuit 200 to charge the battery 220 in a predictable and appropriate manner. The output of the rectifier 250 provides the DC input voltage Vdc for use in charging the battery 220.

In the illustrated embodiment, the trickle charge resistor 240 is coupled in parallel with the charging switch 235 and provides a conductive path for the trickle charging current Itc. The trickle charge resistor 240 can be of any appropriate value to establish a trickle charge to the battery 220 while minimizing the modulation of the charging switch 235. The value of the trickle charge resistor 240 determines a minimum value for the trickle charging current Itc based on the minimum value of the trickle voltage Vtc. The trickle charging current Itc is nominally 50 milliamperes in this embodiment. Of course, the trickle charging current Itc may increase as the magnitude of AC input voltage Vac and, therefore, the magnitude of the DC input voltage Vdc increases. The trickle charging current Itc establishes a minimum level for the total battery charging current Ibc.

In the illustrated embodiment, the controller 245 is actually embodied in a processor that may already exist in the battery-powered electronic device. A digital signal processor (DSP) or a communications signal processor (CSP) may be employed to direct the functions of the wireless communication circuitry 215 and thereby the basic operation of the cordless telephone. The DSP or CSP may be employed as the controller 245 for the battery charging circuit 200. For instance, a Lucent DSP 1609 designed by Lucent Technologies of Murray Hill, N.J. may be employed in the present environment to advantage.

The controller 245 modulates the charging switch 235 depending on several voltages. Here, the controller 245 measures voltages that are critical to the proper charging of the battery 220. These voltages include the DC input voltage Vdc (measurable between nodes A and C) and the battery voltage Vbat (between nodes B and C). The trickle voltage Vtc and the corresponding trickle charging current Itc may be calculated from these two voltages as needed by the controller 245.

The controller 245 analyzes these voltages and determines an appropriate duty cycle needed to charge the battery 220 in an optimum way without over-stressing it in the charging process. Selection of the appropriate duty cycle and, therefore, the appropriate charge current may extend the life of the battery 220 and allows it to maintain a maximum capacity for a longer period of is time. In this embodiment, the duty cycle may be selected from a preprogrammed set of discrete duty cycles that establishes a corresponding set of discrete charging rates for the battery 220. The charging switch 235 may also be modulated to increase or decrease the duty cycle, based on the DC input voltage Vdc, the battery voltage Vbat or a difference between the two voltages. In an alternative embodiment, the duty cycle may be continuously adjustable thereby allowing the charging rate to vary continuously depending on the DC input voltage Vdc and the battery voltage Vbat across the battery 220.

The controller 245 drives the charging switch 235 to conduct for a period determined by the duty cycle selection. In the illustrated embodiment, there are ten equally spaced, discrete duty cycles. When the primary interval D is equal to the switching signal period of 1000 milliseconds, for instance, a maximum switch charging current Isc of 500 milliamperes is provided to the battery 220. The other nine discrete values for the duty cycle allow selection of switch charging currents Isc that range from zero to 450 milliamperes in 50 milliampere increments.

In summary, the present invention introduces, in one aspect, the concept of a battery charging circuit that charges a battery of a battery-powered electronic device in a more accurate manner. By monitoring, in one embodiment, the input voltage, the battery voltage itself and the minimum rate of trickle charge current, the battery charging circuit can employ a charging strategy specifically targeted to the battery being charged.

Although the present invention has been described in detail, those skilled in the art should understand that they can make various changes, substitutions and alterations herein without departing from the spirit and scope of the invention in its broadest form.

What is claimed is:

1. For use with a battery-powered electronic device having a base interface and a battery, a battery charging circuit, comprising:
    a charging switch, coupled between said base interface and said battery, adapted to provide a conductive path for charge current from said base interface to said battery when an input voltage of said circuit is greater than a voltage of said battery, said charge current based on said input voltage and said voltage of said battery; and
    a controller adapted to modulate said charging switch at a duty cycle that at least in part determines a rate at which said charge current is delivered to said battery thereby to compensate at least in part for variations in said input voltage.

2. The circuit as recited in claim 1 further comprising a trickle charge resistor, coupled in parallel with said charging switch, adapted to provide a trickle charging conductive path for a trickle charging current.

3. The circuit as recited in claim 1 wherein said controller comprises a processor adapted to modulate said charging switch based on said input voltage.

4. The circuit as recited in claim 1 wherein said controller comprises a processor adapted to modulate said charging switch based on said voltage of said battery.

5. The circuit as recited in claim 2 wherein said controller comprises a processor adapted to modulate said charging switch based on said trickle charging current.

6. The circuit as recited in claim 1 wherein said controller contains a preprogrammed set of discrete duty cycles for said charging switch adapted to establish a corresponding set of discrete charging rates.

7. The circuit as recited in claim 1 wherein said battery-powered electronic device is a cordless telephone.

8. A method of charging a battery of a battery-powered electronic device having a base interface and a battery, comprising:
    closing a charging switch, coupled between said base interface and said battery, to provide a conductive path for charge current from said base interface to said battery when an input voltage of said battery-powered electronic device is greater than a voltage of said battery, said charge current based on said input voltage and said voltage of said battery; and
    modulating said charging switch at a duty cycle that at least in part determines a rate at which said charge current is delivered to said battery thereby to compensate at least in part for variations in said input voltage.

9. The method as recited in claim 8 further comprising providing a trickle charging conductive path for a trickle charging current.

10. The method as recited in claim 8 wherein said modulating is performed by a controller comprising a processor that modulates said charging switch based on said input voltage.

11. The method as recited in claim 8 wherein said modulating is performed by a controller comprising a processor that modulates said charging switch based on said voltage of said battery.

12. The method as recited in claim 9 wherein said modulating is performed by a controller comprising a processor that modulates said charging switch based on said trickle charging current.

13. The method as recited in claim 8 wherein said modulating is performed by a controller that contains a preprogrammed set of discrete duty cycles for said charging switch that establishes a corresponding set of discrete charging rates.

14. The method as recited in claim 8 wherein said battery-powered electronic device is a cordless telephone.

15. A cordless telephone, comprising:

a base having a handset interface; and a handset, including:

wireless communication circuitry, a battery that powers said wireless communication circuitry, a base interface removably couplable to said handset interface to allow said battery to receive charge current from said base, and a battery charging circuit, including:

a charging switch, coupled between said base interface and said battery, that provides a conductive path for said charge current from said base to said battery when an input voltage of said battery charging circuit is greater than a voltage of said battery, said charge current based on said input voltage and said voltage of said battery, and a controller that modulates said charging switch at a duty cycle that at least in part determines a rate at which said charge current is delivered to said battery thereby to compensate at least in part for variations in said input voltage.

16. The cordless telephone as recited in claim 15 wherein said battery charging circuit further comprises a trickle charge resistor, coupled in parallel with said charging switch, that provides a trickle charging conductive path for a trickle charging current.

17. The cordless telephone as recited in claim 15 wherein said controller comprises a processor that modulates said charging switch based on said input voltage.

18. The cordless telephone as recited in claim 15 wherein said controller comprises a processor that modulates said charging switch based on said voltage of said battery.

19. The cordless telephone as recited in claim 16 wherein said controller comprises a processor that modulates said charging switch based on said trickle charging current.

20. The cordless telephone as recited in claim 15 wherein said controller contains a preprogrammed set of discrete duty cycles for said charging switch that establishes a corresponding set of discrete charging rates.

\* \* \* \* \*